Patented Mar. 30, 1926.

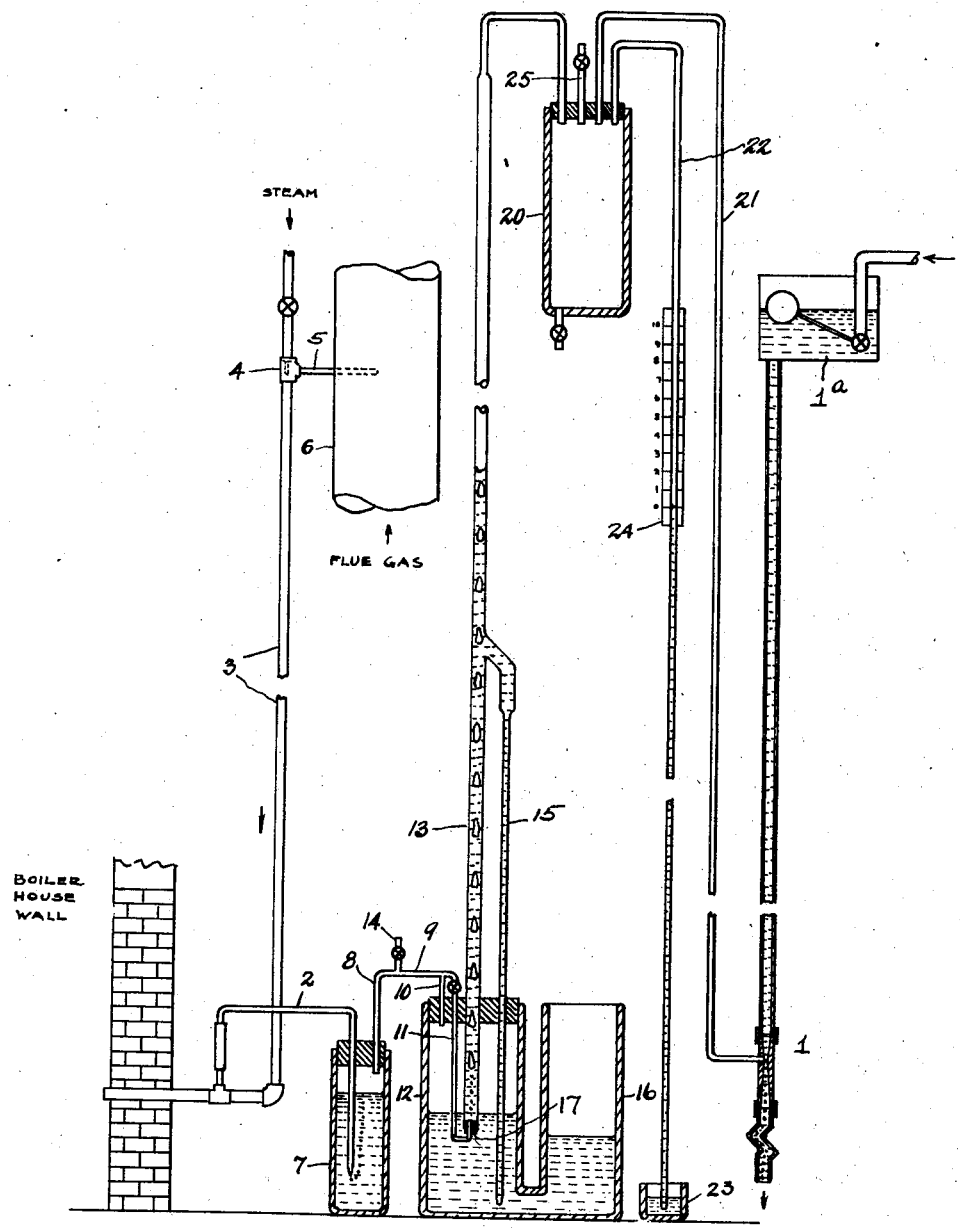

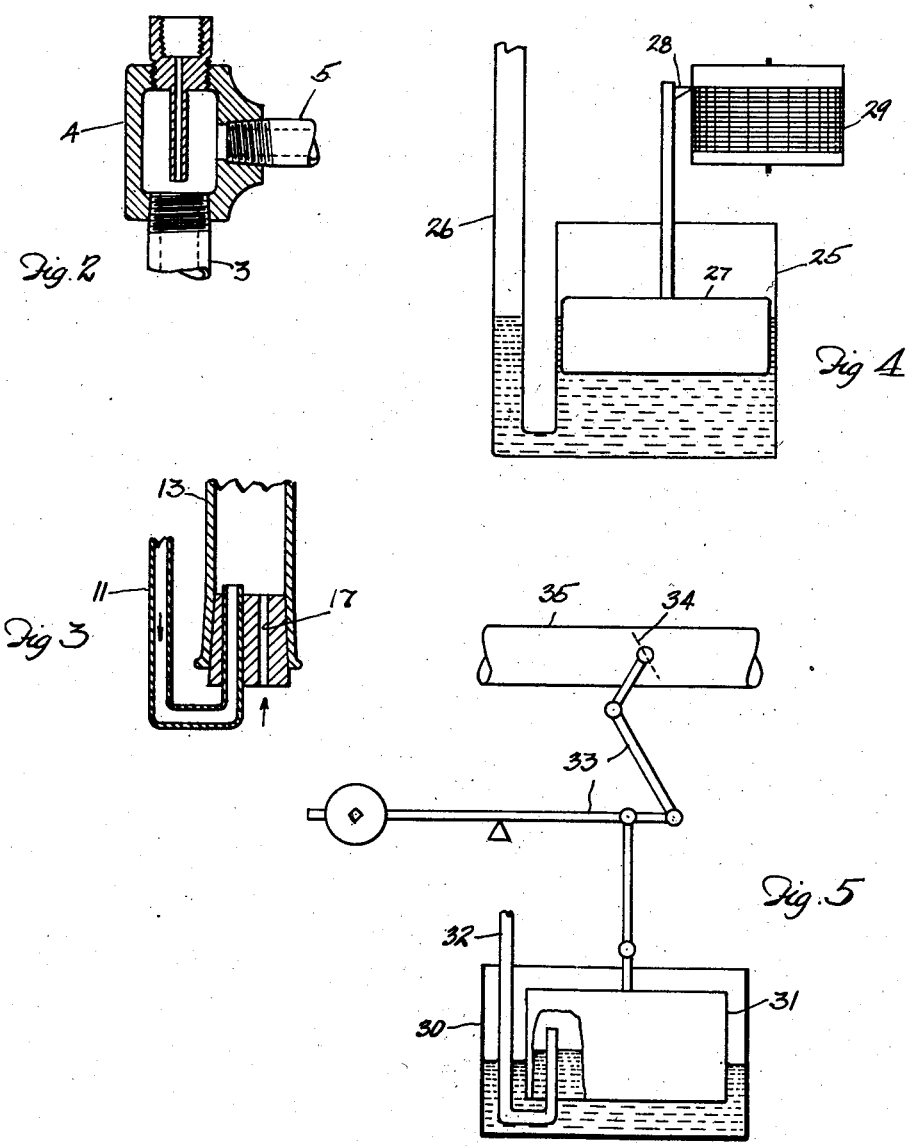

1,578,697

UNITED STATES PATENT OFFICE.

LAWRENCE YOUNG AND GILBERT W. RUGGLES, OF YOUNGSTOWN, OHIO.

AUTOMATIC GAS ANALYZER AND CONTROL.

Application filed June 15, 1922. Serial No. 568,563.

*To all whom it may concern:*

Be it known that we, LAWRENCE YOUNG and GILBERT W. RUGGLES, citizens of the United States, and residents of Youngstown, county of Mahoning, State of Ohio, have jointly invented a new and useful Improvement in Automatic Gas Analyzers and Controls, of which the following is a specification, the principle of the invention being herein explained and the best mode in which we have contemplated applying that principle, so as to distinguish it from other inventions.

The present improvements relate more particularly to a method for continuously determining the amount of a given gas in a mixture thereof with other gases, as well as an apparatus specially designed for use in such method. Our improvements further include the automatic control of an operation, i. e., any chemical or other process, by means of the automatic analysis of a gas or gases resulting from such process. We are aware that various types of instruments have heretofore been devised for recording carbon-dioxide ($CO_2$) in flue gases, Bulletin 91 of the Bureau of Mines, U. S. Department of the Interior, affording a description with instructions for installation and operation of the best known instruments of this type. Most of such instruments on the market, however, are intermittent in operation, which involves a considerable time lag between the arrival of a gaseous composition at the apparatus and the registering of its condition on the gauges. Moreover, no such prior apparatus, so far as we are aware, is either designed for or capable of automatically translating the results of the analysis into the actuation of a control device.

Among the objects sought to be accomplished by the present invention, in addition to the general ones just stated, are the provision of means for bringing the flue gases or other gaseous mixture to the apparatus always under the same pressure, preferably atmospheric; the provision of means for making the variation in suction pressure due to the absorption of carbon-dioxide or similar constituent in the gases being analyzed large enough to properly register; as well as various structural and operative details, all of which will be hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a diagrammatic representation of an apparatus embodying our present improvements; Figs. 2 and 3 are sectional views, on a somewhat larger scale, of details of such apparatus; Fig. 4 illustrates the manner in which the apparatus may be connected with a recording device; and Fig. 5 similarly illustrates the manner in which the apparatus may be connected with a control device.

Referring first to the general layout illustrated in Fig. 1, suction is created on the system by water-actuated siphon 1, which is on the order of a Venturi tube, the water being supplied under a substantially constant head to said siphon from a float chamber $1^a$. The gases to be analyzed are received into the system through a tube 2 that is connected with a larger duct 3 constituting a sampling pipe. A small steam aspirator 4 (see Fig. 2), having a branch connection 5 with flue 6, is connected with one end of said pipe 3, while the other end of the latter is open to atmosphere, as shown in Fig. 1. By blowing the gas gently down such sampling pipe 3 and taking off the gases to be analyzed from near the open end thereof through the small duct 2, it will be obvious that such gases are thus taken off at atmospheric pressure regardless of any change of draft in the flue 6.

If desired, the gases before they are received into said duct 2 may be cleaned, it being deemed unnecessary to illustrate any such cleaning device for the purpose in hand. The discharge end of said duct extends downwardly below the level of the water in a bubbler vessel 7, the gases thence passing out through a second duct 8 that forms one leg of an inverted U-shaped tube 9, the other leg of which is divided into two branches 10 and 11, the first of which vents directly into the space over the fluid in the absorbing vessel 12, while the other is connected with the main stem or body of the absorption tube 13 that rises from such vessel, the lower end of said tube depending below the level of the liquid in said vessel, as shown in Fig. 1. The intermediate portion 9 of the U-shaped tube thus connecting the bubbler vessel with said absorber vessel is provided with a valve-controlled connection 14 wherewith a standard Orsat analyzer may be coupled when it is desired to check up the operation of the apparatus. Connected to the side of absorption tube 13 is a circulator branch 15 through which a small part of the liquid in the absorber vessel that is drawn upwardly into said tube 13 is returned to the main body of such liquid in the vessel.

The tops of both the bubbler and absorber vessels are tightly closed with suitable corks except for the ducts or tubes heretofore described as entering said vessel. It should be noted, however, that connected with the lower portion of absorber vessel 12, below the level of the liquid therein, is a second vessel 16 that is open to the atmosphere. It should also be noted that the mouth of duct 2, where the latter discharges in bubbler vessel 7, is restricted for a purpose that will be explained later, said duct being furthermore adjustable up and down in said vessel as to vary the head resistance caused by the water in said vessel.

The manner in which branch 11 of the U-shaped duct that connects the bubbler vessel with the absorber vessel is led into the lower end of absorption tube 13 is shown in detail in Fig. 3, which furthermore clearly shows a separate opening 17 through which such tube is directly connected with the liquid in said absorption vessel.

The upper end of absorption tube 13 is re-curved and discharges into the upper end of a normally sealed vessel or chamber 20. From the latter residual gases unabsorbed in said tube 13 are drawn out through tube 21 that is connected with the siphon 1, previously referred to, as the means whereby suction is created in the system. There is also connected with the upper end of said vessel 20 a gauge line 22, the lower end of which is open and terminates in a vessel 23 containing a body of liquid, which liquid will be raised in the tube by the suction existing in the apparatus, a scale 24 being placed alongside said tube 22 and being calibrated in convenient units to permit observation and record to be made of variations in the height of the column of liquid in said tube. Vessel 22 is also provided with a valve-controlled relief duct 25 whereby air may be admitted to the system and the pressure therein be conveniently brought to atmospheric, whenever desired. The top of vessel 23, it will of course be understood, is open to atmosphere and the float tank 1ª is similarly open to atmosphere.

The operation of the apparatus, as thus far described, will now be indicated, it being assumed by way of illustration that carbon-dioxide is the gas to be analyzed for, inasmuch as the determination of the percentage of such gas in flue gas is one of the principal uses to which apparatus of the type in question is applied. In such case the liquid in vessels 12 and 16 will be a solution of potassium hydroxide (KOH), or other suitable reagent capable of absorbing carbon-dioxide when gases containing the latter are exposed to such liquid and agitated therewith. The gases drawn into duct 2, after bubbling up through the water in vessel 3, pass through the U-shaped tube 9 into the lower end of absorption tube 13. In bubbling up through the potassium hydroxide solution in the latter, the carbon-dioxide is absorbed from the gases, the residuum passing on to vessel 20 and thence down tube 21 and out through siphon 1. The hydroxide solution, it will be understood, has free access to the inside of the absorption tube through the small hole 17 (Fig. 3) previously referred to, and by means of the return tube 15 leading from the side of absorption tube 13 back to vessel 12, a circulation of such hydroxide through the lower portion of tube 13 is maintained, thus keeping the solution in the latter active.

The water under the constant head maintained in float chamber 1ª in flowing to the siphon will produce a constant suction, while a constant quantity of gases is being delivered to the siphon through tube 21. Before starting, the level of the hydroxide solution in absorption vessel 12 is slightly above the mouth of the depending leg 11 of the U-shaped tube 9, but upon the suction from the siphon being transmitted to the absorption tube, the suction is strong enough to break the seal in the bottom of the latter and cause the gases to bubble through the solution. As the gases received through duct 2 and bubbler vessel 7 break the seal and bubble through the solution in the absorption tube, due to the constriction of the outlet of duct 2 in bubbler vessel 7, a loss in head takes place and the gases accordingly enter the absorption tube under a partial vacuum, and as a result of this vacuum, the hydroxide solution will be drawn into the absorption tube through the hole 17. The amount of suction exerted by the siphon will depend in part on the height of the liquid in the absorption tube, and consequently the pressure head on this liquid, which tends to hold back the gases received through duct 2. There is also an aspirating effect on the gases passing into the absorption tube which tends to draw more liquid into the latter through such hole 17.

The gases with the hydroxide solution thus drawn into the absorption tube pass up the latter until the gases break through the surface of the liquid, whereupon the latter gradually flows back through circulator tube 15 to vessel 12 due to the fact that the column of liquid in said tube, being free from gas bubbles, is heavier than the liquid in the main absorption tube and so tends to fall by gravity.

If the gas being drawn into the apparatus were ordinary air, or other gas inert to the solution in vessel 12, the conditions in such apparatus will presently become constant, the surface of the liquid in absorption tube 13 will remain at approximately a fixed level and the suction created by the siphon will be measured by the rise of the liquid in the gauge tube 22, such liquid likewise coming to rest at approximately a fixed point. Meanwhile it will be noted that the slight suction in the U-shaped tube, that connects the bubbler and absorption vessels, is transmitted through the branch 10 of said tube to the dead gas space above the solution in said absorption vessel, thus causing the liquid level in the latter to rise and such level to correspondingly fall in connected vessel 16. With air flowing through the system and conditions thus at rest, the reading on the gauge determines the zero point.

Assuming now that the gases received in the apparatus contain a percentage of carbon-dioxide as they pass upwardly in the absorption tube, such carbon-dioxide will be absorbed by the hydroxide solution and a smaller volume will hence be delivered to the siphon through vessel 20 and duct 21. Due to the constriction of the outlet of duct 2 and its immersion in the water in bubbler vessel 7, while more gas will pass through when the suction increases, a greater differential of pressures on the two sides of the constriction accompanies such passage of a greater volume of gas. At the same time, due to the absorption just referred to, the volume entering the siphon per unit time is decreased by the amount of carbon-dioxide absorbed. The effect of this is to increase the suction which in turn raises the liquid in the absorption tube and this in turn increases the head on the gas entering the absorption tube and tends further to increase the suction. The suction pressure being connected with the space above the liquid in the absorption vessel as the suction increases, due to absorption, it will raise the level of the liquid in said vessel by drawing on the supply in the adjacent vessel 16. It has been found by actual test that a very small variation in the height of the liquid in vessel 12, and therefore in the degree of immersion of the absorption tube, will cause a considerable variation in the height of liquid in the absorption tube and correspondingly in the height of liquid in the gauge tube 22.

In this way we overcome one of the principal difficulties encountered in an apparatus of the type in hand in that we make the variation in the suction pressure, due to the absorption of carbon-dioxide, large enough to properly register. In other words, by absorbing the carbon-dioxide in the absorption tube and coupling therewith means whereby such absorption serves to raise the liquid level in the tube, we increase the head the gas works against in the tube and hence increase the reading on the gauge. It will further be noted that by having a supplemental vessel 16 for the absorbent liquid freely connected, as shown, with absorber vessel 12, and by venting the pressure in the U-shaped connection between the bubbler vessel and such absorber vessel through branch duct 10, the increase in suction is effective to raise the liquid level in said absorber vessel, thus increasing the height of the liquid in the absorption tube and hence the gauge reading. By varying the relative sizes of vessels 12 and 16, it is possible to vary the length on the scale 24 which represents a unit percentage of carbon-dioxide absorbed.

The apparatus, as shown in Fig. 1, is purely an indicating device. However, such apparatus may be readily adapted for the making of a permanent record as by the means shown in Fig. 4, such means consisting of a float chamber 25 connected by means of a duct 26 in place of or in parallel with the gauge line 22. The suction in vessel 20 will then cause the float 27 in said chamber 25 to rise or fall, as the case may be, and thereby actuate a pen 28 arranged to mark on a revolving chart drum 29 and thus make a record of the amount of carbon-dioxide in the gas being analyzed throughout any given period. Instead of the particular type of recorder just described, any standard differential recording gauge, properly calibrated, may of course be used.

The modification illustrated in Fig. 5 shows the adaptation of our apparatus for use in positively controlling some phase of the process whereby the carbon-dioxide to be analyzed is produced. A float chamber 30 is provided with a counter-weight floating drum 31 to which the vacuum, resulting from the suction produced by siphon 1, is communicated through a duct 32 that is either substituted for or in parallel with gauge line 22. The variation in suction or pressure caused by variation in the amount of carbon-dioxide in the gas being analyzed will accordingly cause drum 31 to rise or fall, as the case may be, and by means of a system of levers 33, this movement is communicated to a valve 34 in a pipe 35. The latter may be a pipe supplying air or any other constituent to a combustion process or the like, by means of which the carbon-dioxide in the gas being analyzed is produced. For example, when such carbon-dioxide decreases, the air supplied to the process can be automatically decreased in the proper proportion to raise the dioxide content back to the point desired; or if the process is supported by a gaseous fuel and the air feed is constant, the supply of such fuel can be similarly controlled to give the required proportion of carbon-dioxide. By the use of pilot devices the control can be applied to the supplying of powdered fuel, oil firing, automatic stoker mechanism and the like, as need not be explained in detail.

It will be understood, of course, that by using the proper reagent, the apparatus is readily adapted for the analysis of various other gases than the carbon-dioxide, which has been referred to by way of specific illustration, and a wide range of applications of the control feature accordingly exists. Also, the necessary parts of the apparatus may be arranged in tandem or otherwise so as to make it possible to analyze two or more constituents of the original gaseous mixture; while in place of a liquid absorbing medium a so-called dry absorbent may be substituted, placing same in the system between the absorption tube and the siphon or equivalent suction-producing means.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, and means for placing the latter under suction.

2. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, and a fluid operated siphon connected with the latter for placing the same under suction.

3. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, and a fluid operated siphon connected with the latter for placing the same under suction, said siphon operating under a constant head.

4. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, said duct also having a branch connected with said sealed vessel part above the liquid level therein, and means for placing said absorption tube under suction.

5. In an aparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, means for supplying the gases to be analyzed to said duct at substantially constant pressure, and means for placing said absorption tube under suction.

6. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, means for supplying the gases to be analyzed to said duct at substantially atmospheric pressure, and means for placing said absorption tube under suction.

7. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, an aspirator for drawing the gases to be analyzed from the stack or other source, said aspirator discharging into the atmosphere and said duct being connected with the discharge side thereof so as to receive such gases at substantially constant pressure, and means for placing said absorption tube under suction.

8. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, a bubbler vessel interposed in said duct, and means for placing said absorption tube under suction.

9. In an apparatus for analyzing gaseous mixtures, the combination of a vessel containing a liquid capable of absorbing a constitutent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, a bubbler vessel interposed in said duct, said bubbler vessel being arranged to cause a loss of head of the gases passing therethrough, and means for placing said absorption tube under suction.

10. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed part of said absorption vessel, a sealed bubbler vessel containing a suitable liquid, a gas supply duct discharging below the liquid level in said bubbler vessel, a duct leading from above such liquid level and discharging into the lower end of said absorption tube, and means for placing the latter under suction.

11. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed part of said absorption vessel, a sealed bubbler vessel containing a suitable liquid, a gas supply duct discharging below the liquid level in said bubbler vessel, a duct leading from above such liquid level and discharging into the lower end of said absorption tube, said duct also having a branch connected with said sealed vessel part above the liquid level therein, and means for placing said absorption tube under suction.

12. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed part of said absorption vessel, a sealed bubbler vessel containing a suitable liquid, a gas supply duct discharging below the liquid level in said bubbler vessel, the discharge end of said duct being restricted, a duct leading from above such liquid level and discharging into the lower end of said absorption tube, and means for placing the latter under suction.

13. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed part of said absorption vessel, a sealed bubbler vessel containing a suitable liquid, a gas supply duct discharging below the liquid level in said bubbler vessel, an inverted U-shaped duct leading from above such liquid level and discharging into the lower end of said absorption tube, a valve for closing said last-named duct, and means for placing said absorption tube under suction.

14. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed part of said absorption vessel, a sealed bubbler vessel containing a suitable liquid, a gas supply duct discharging below the liquid level in said bubbler vessel, an inverted U-shaped duct leading from above such liquid level and discharging into the lower end of said absorption tube, a valve-controlled connection leading from said last-named duct for coupling a separate analyzing apparatus therewith, a valve for closing connection from said duct to said absorption tube, and means for placing the latter under suction.

15. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, the latter being otherwise nearly closed so as to afford only a restricted opening for the entry of liquid from said vessel, and means for placing said absorption tube under suction.

16. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, a sealed chamber connected with the upper end of said absorption tube, means connected with said chamber for placing same under suction, and means for indicating variations in the degree of vacuum in said chamber.

17. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, a sealed chamber connected with the upper end of said absorption tube, means connected with said chamber for placing same under suction, and a gauge line also connected with said chamber, the lower end of said gauge line terminating in an open body of liquid.

18. In an apparatus for analyzing gaseous mixtures, the combination of a vessel containing a liquid capable of absorbing a constituent of such mixture, said vessel including two parts connected below the level of such liquid, one part sealed and the other open to the atmosphere, an absorption tube rising from below the liquid level in such sealed part, a branch tube extending from the side of said absorption tube back to said sealed vessel part, a gas supply duct discharging into the lower end of said absorption tube, a sealed chamber connected with the upper end of said absorption tube, means connected with said chamber for placing same under suction, a connection for opening said chamber to the atmosphere, and a gauge line also connected with said chamber, the lower end of said gauge line terminating in an open body of liquid.

Signed by us, this 12th day of June, 1922.

LAWRENCE YOUNG.
GILBERT W. RUGGLES.